United States Patent Office 3,713,830
Patented Jan. 30, 1973

3,713,830

PRESENSITIZED LITHOGRAPHIC PRINTING PLATE AND PROCESS FOR PREPARING SAME

Leonard James Watkinson, Leeds, England, assignor to Howson-Algraphy Limited, Leeds, Yorkshire, England
No Drawing. Filed Dec. 24, 1970, Ser. No. 101,388
Int. Cl. G03c *1/94, 1/00;* G03f *7/02*
U.S. Cl. 96—86 R    13 Claims

ABSTRACT OF THE DISCLOSURE

A presensitised printing plate comprises a support sheet of aluminium or aluminium alloy having a surface which has been anodised using aqueous phosphoric acid as electrolyte. A layer of light sensitive material comprising a mixture of a novolak resin and a diazo salt is applied to the anodised surface. The diazo salt may be used in the form of a stable double salt or a stable complex. The presensitised printing plate is storage stable for long periods and, on processing gives rise to a lithographic printing plate capable of producing many copies.

This invention relates to improved presensitised printing plates comprising a support of aluminium, or an alloy thereof capable of being anodised, coated with a light sensitive material.

The production of lithographic printing plates from anodised aluminium sheet has been practised sucessfully for many years by the "Deep Etch" or "Gum Reversal" process. It has been shown that the anodic surface of the aluminium sheet confers very improved wearing and printing properties to a plate over and above those of non-anodised aluminium plates.

There are fundamentaly two types of an anodic film which can be produced on aluminium, namely non-porous and porous films. It is the porous films which are suitable for lithographic purposes, since the porous film confers a better water receptive surface to the non-image areas of the plate and allows image-forming material to anchor effectively to the surface by penetrating the pores. Porous anodic films have been produced on aluminium sheet by passing a direct current through a 15 volume percent aqueous solution of sulphuric acid using the aluminium as the anode and lead as the cathode. This method appears to be the one most generally used at the present time, it being noted that this method is simple, cheap and easily controlled. However, if has been found that in general the presensitized plates produced by applying a photopolymerisable resin to aluminium sheet anodised by the aforementioned conventional sulphuric acid process do not have printing surfaces (after suitable exposure to radiation and development) which are acceptable as far as resistance to machine wear is concerned. In an attempt to improve the wearing properties, many variations in the conditions of forming the anodic film on the aluminium, such as altering the current density, the duration of the current flow and the temperature of the electrolyte, have been used, resulting in aluminium sheets having layers of anodic film from 0.2 to 6 microns thick and of varying porosity. However, printing plates produced from aluminium sheet anodised in these various ways have not been lithographically acceptable.

Satisfactory lithographic printing plates having improved wearing properties can be obtained from presensitised printing plates produced in accordance with our copending United States patent application No. 775,164, now Pat. No. 3,594,289, by electrolytically anodising an aluminium or aluminium alloy sheet using an aqueous solution of phosphoric acid as the electrolyte and coating the anodised surface with a photopolymerisable resin ester of an unsaturated acid. Moreover, these presensitised printing plates are storage stable even though they do not include an interlayer between the anodised surface of the sheet and the resin ester layer. It has now surprisingly been found that equally satisfactory printing plates can be produced by replacing the photopolymerisable resin ester with a light sensitive mixture of a low molecular weight diazo salt and a novolak resin. More particularly, persensitised plates produced in this way have improved wearing properties and, despite the absence of an interlayer, are storage stable.

According to one aspect of the present invention there is provided a process for preparing a presensitised printing plate which comprises electrolytically anodising an aluminium or aluminium alloy support sheet using an aqueous solution of phosphoric acid as the electrolyte, and coating the anodised surface with a light sensitive mixture of a novolak resin and a diazo salt.

According to another aspect of the present invention there is provided a presensitised printing plate comprising a sheet of aluminium or aluminium alloy having a surface which has been electrolytically anodised in phosphoric acid electrolyte and a coating of a light sensitive mixture of a novolak resin and a diazo salt on the surface.

The diazo salts used in accordance with the present invention are low molecular weight aromatic compounds bearing a diazo group attached to a carbon atom of an aromatic nucleus, the other valence of the diazo group being satisfied by an acid ion. The diazo salt is preferably a diazo-p-aminobenzene, i.e., a compound having the general

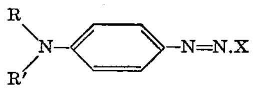

wherein R and R′, which can be the same or different, each represent hydrogen or an aliphatic or aromatic radical and X represents an acid radical, e.g., derived from a mineral acid. In the above formula, R and R′ may be, for example, alkyl or hydroxyalkyl radicals such as methyl or ethyl radicals, aryl radicals such as phenyl or benzyl radicals, or alkoxy radicals such as ethoxy radicals. Moreover, R and R′ may, in conjunction with the nitrogen atom of the amine group, together constitute a heterocyclic radical such as a morpholino radical.

If desired, the aromatic nucleus in the above formula may carry one or more substituents such as halogen atoms or alkyl, carboxy, alkoxy, acetoxy, carbamyl, or nitro groups. The diazo salts are preferably used in their stabilized form as known in the art. Thus, they may be in the form of stable double salts with metal halides for example zinc chloride or in the form of stable complexes with non-metallic fluorides such as fluoboric acid. Examples of diazo salts which may be used in accordance with the present invention are p-dimethylaminobenzene diazonium chloride, p-diethyl aminobenzene diazonium chloride, p-hydroxyethyl aminobenzene diazonium chloride, p-phenylethylaminobenzene diazonium chloride, p-phenylmethylaminobenzene diazonium chloride and 4′-methoxy diphenylamine-4-diazonium chloride, preferably in the form of stable double salts with for example zinc chloride or in the form of stable complexes such as the fluoborates. Other suitable stabilised diazo salts are the double salt of p-ethyl hydroxy ethyl aminobenzene diazonium chloride and zinc chloride and the fluoborate complex of 2,5-diethoxy 4-morpholino benzene diazonium chloride.

By selecting a diazo salt of suitable spectral sensitivity for use in accordance with the present invention it is possible to obtain light sensitive materials giving satisfactory tonal renderings when a half-tone screen is used.

Novolak resins as used in accordance with the present invention are well known as such and are soluble fusible resins produced by condensing together a phenol having two or three reactive aromatic ring hydrogen positions (such as phenol itself), usually in a slight molar excess, and an aldehyde (such as formaldehyde) or an aldehyde liberating compound capable of undergoing phenol-aldehyde condensation. Examples of particularly useful phenols (in addition to phenol itself) are cresol, xylenol, butyl phenol, ethyl phenol, isopropyl methoxy phenol, chlorophenol, resorcinol, hydroquinone, naphthol and 2,2-bis (p-hydroxyphenyl)-propane. Examples of particularly useful aldehydes (in addition to formaldehyde) and aldehyde liberating compounds are acetaldehyde, acrolein, crotonaldehyde, furfural and 1,3,5-trioxane. Generally, less than 6 moles of aldehyde are used per 7 moles of phenol. As a typical example of the preparation of a novolak, 1 mole of phenol is heated with 0.5 mole of formaldehyde under acidic conditions. The reaction temperature used is generally from about 25° C. to 175° C. Novolak resins have no reactive methylol groups in the molecule and hence are incapable of condensing with other novolak molecules on heating without the addition of hardening agents. Examples of commercially available novolak resins which have been used in the present invention are those known under the trade designations Alnovol 429K and Alnovol 320 K. Alnovol 429K is a novolak resin having a neutral acid value and a melting range of from 108 to 118° C. (by the capillary method) and produced by condensing together cresylic acid (i.e., a mixture of the three cresols) and formaldehyde under acid conditions in the presence of 5% maleic acid. Alnovol 320 is a novolak resin having a neutral acid value and a melting range of from 75 to 82° C. (by the capillary method) and produced by condensing together phenol and formaldehyde. Other commercially available novolak resins of use in accordance with the present invention are those known under the designations Bakelite R5468/1, Bakelite R10840, Bakelite R17314A, Bakelite R546811, I.C.I. PF402, Dow 395–480, Dow 395–850 and Dow 385–1300.

The low molecular weight diazo salt used in accordance with the present invention is believed to form a stable light sensitive molecular compound with the novolak resin on simple admixture therewith. This light sensitive molecular compound constitutes a durable printing image when the presensitised printing plate is processed. The relative proportions of diazo salt and novolak which can be used to form the light sensitive coating in accordance with the present invention depend primarily upon the light sensitivity of the diazo salt. Generally, the higher the proportion of novolak, the less sensitive to light is the coating. In practice, the diazo salt and novolak are preferably present in a ratio of about from 1:2 to about 1:15 by weight respectively. The diazo salt and the novolak are preferably mixed together in a suitable medium, e.g. in an alcohol solution. Coatings of the diazo salt/novolak compound can be applied to the phosphoric acid anodized support sheet by known methods, with the use of solvents or without. Some examples of various application methods which can be used are: coating with a whirler, dipping, coating with a roller, spraying, misting (powdering), or applying in an electrostatic field. After being applied to the support the mixture is preferably heated for a short period of time at about 100° C. This heating is believed to complete the formation of the loose molecular compound from the diazo salt and the novolak and increases the resistance of the light sensitive coating to alkaline solutions.

The porosity of the anodic film produced on the support sheet increases as the concentration of the phosphoric acid in the electrolyte increases. Generally, the electrolyte consists of a 5 to 40% v./v. aqueous solution of 1.75 S.G. phosphoric acid. If an electrolyte more concentrated than a 50% v./v. aqueous solution of 1.75 S.G. phosphoric acid is used, problems arising from "drag-out" occur. The anodic film should be such as to enable the light sensitive diazo salt/novolak compound to be securely anchored thereto and to retain, in the non-printing areas, sufficient water to prevent scumming of such areas. If the anodic film is too porous, the non-printing areas tend to take-up ink during printing. In order to obtain optimum porosity, it is preferred to use a 10 to 30% v./v. solution of 1.75 S.G. phosphoric acid as electrolyte. The current density is preferably from 0.5 to 2.0 amperes per square decimetre and in practice this is achieved by maintaining the voltage in the range from 10 to 50 volts. The temperature of the electrolyte can be from 15 to 40° C. At temperatures below 15° C., hard anodising tends to occur. However, at temperatures greater than 30° C., dissolution tends to occur and the film tends to be too porous. It is preferred therefore to maintain the electrolyte at a temperature of from 15 to 30° C.

The anodising time may be from 2 to 20 minutes and is dependent upon the electrolyte temperature. In general, the higher the electrolyte temperature the shorter the anodising time. In practice, the anodising time is from 2 to 10 minutes.

In accordance with the present invention, a grained or ungrained aluminum or aluminum alloy support sheet may be used. A grained sheet is however preferred since this provides better water receptivity. It is also preferred to use a sheet having a surface which has been mechanically or electrochemically roughened, so that the non-printing areas of the resultant printing plate retain the fountain solution during printing more readily.

The presensitised printing plates of the present invention can be stored for a long period prior to use in spite of the fact that no interlayer is present between the diazo salt/novolak layer and the anodised surface of the support. When such printing plates are imagewise exposed in use, the diazo salt/novolak coating in those areas struck by light breaks down and becomes more soluble in alkaline solution then the non-light struck areas of the coating. Thus by developing the image-wise exposed presensitised printing plate by means of an alkaline developer such as an aqueous solution of tri-sodium phosphate, sodium silicate, caustic soda or mixtures of two or more thereof, a positive working printing plate is produced comprising printing areas constituted by the non-light struck areas of the light sensitive coating and non-printing areas constituted by the underlying anodised surface of the support revealed on development.

Presensitised printing plates in accordance with the present invention have very improved wearing properties and are capable, after being suitably processed, of producing many thousands of good quality copies. This is believed to be due to the fact that anodising with an aqueous solution of phosphoric acid as electrolyte produces an anodic film of improved porosity on the surface of the support sheet to which the light sensitive diazo salt/novolak compound can be firmly anchored. On the other hand, the anchorage of the diazo salt/novolak to the anodised surface is such that even though the presensitised plate may have been stored for many months before being image-wise exposed, the light struck areas of the diazo salt/novolak can be readily removed from the anodised surface on development.

The following examples illustrate the invention.

EXAMPLE 1

Any grease on a sheet of lithographic quality aluminum of 99.7% purity was removed by immersing in 6 percent w./v. aqueous solution of sodium hydroxide for 8 minutes. The degreased sheet was then immersed in a 25% v./v. aqueous solution of 1.75 S.G. orthophosphoric acid. The sheet was then connected up in a circuit as the anode, the cathode being made of lead, and a current having a density of 1.5 amperes per square decimetre of anode was passed through the plate for 8 minutes whilst the electrolyte was maintained at a temperature of 30° C. The anodised sheet was then rinsed with water and dried.

A solution comprising 15 g. of a novolak varnish (Alnovol 429K) lacquer, and 4 g. of p-dimethylaminobenzene diazonium chloride in 100 ml. ethanol was prepared and coated onto the anodise aluminum sheet by means of a whirler. After drying, the coating was heated for a short period to a temperature greater than the melting point of the novolak but lower than the decomposition temperature of the diazo salt. The resultant presensitised printing plate could be stored for many months prior to use.

The above procedure was then repeated using a 2S grade aluminum sheet, commercially obtainable from Alcan Ltd. (Such sheets consist of about 99% aluminum and small amounts of iron and silicon.) In both cases, a pre-sensitised printing plate was obtained which, after image-wise exposure and development, gave rise to a lithographic printing plate capable of producing many thousands of good quality copies.

EXAMPLE 2

Two sheets of brush grained aluminium (grade 2S) were immersed in a bath of 10% v./v. aqueous solution of orthophosphoric acid of S.G. 1.75. The sheets were then electrically connected into a circuit and an alternating current was passed therebetween for 8 minutes at a voltage of 21.5 volts whilst the phosphoric acid solution was maintained at a temperature of 20° C. The current density varied from about 1.00 to 0.75 ampere per square decimetre. The thus anodised sheets were then washed with water and dried. A paste comprising 5 parts of a novolak resin (Alnoval 429K), 1 part of p-dimethylaminobenzene diazonium chloride, 1 part butanol and 4 parts ethanol was then applied to each sheet by roller coating. Each sheet was then dried and heated to about 100° C.

The resultant pre-sensitised printing plates were then image-wise exposed for 2 minutes to a 50 amp carbon arc source at a distance of three feet. The plates were then swabbed with a developer consisting of an aqueous solution of trisodium phosphate to remove the light-struck portions of the coating to produce a positive printing image on the aluminium sheets consisting of the non-light struck portions of the coating. The resultant printing plates were very wear resistant and capable of producing many thousands of good quality copies.

EXAMPLE 3

Two sheets of aluminium of 99.7% purity were cleaned free from grease by immersion for 8 minutes in a 6% w./v. solution of sodium hydroxide. The sheets were washed with water and then immersed in a 0.5 w./v. solution of hydrochloric acid and connected to an electrical circuit. The circuit was such that an alternating current of current density 5.0 amps per square decimetre passed through the sheets. The hydrochloric acid solution was maintained at 30° C. and the current was passed for 6 minutes. As a result of this treatment, the surfaces of the sheets were roughened. The sheets were then washed with water and immersed in a bath of a 10% v./v. aqueous solution of orthophosphoric acid S.G. 1.75. The sheets were made, the anodes in an electrical circuit and a steel cathode was provided. Direct current at 30 volts was passed through the circuit for 8 minutes whilst the bath was maintained at a temperature of 25° C. The resultant anodised sheets were then washed and dried.

A solution comprising 7 g. of novolak resin (Alnovol 429K) 2.5 g. of p-dimethylaminobenzene diazonium zinc dichloride and 80 ml. ethanol was prepared and applied to the anodised sheets. The sheets were dried and then heated for a short period to about 100° C. The coated sheets were image-wise exposed and developed in the manner of Example 2. The resultant printing plates were wear resistant and capable of producing many thousands of good quality copies.

EXAMPLE 4

Two sheets of electrolytically etched aluminium (grade 2S) were immersed in a 15% v./v. aqueous solution of orthophosphoric acid S.G. 1.75. The sheets were connected in an electrical circuit and an alternating current at a constant voltage of 19 volts was applied for 4 minutes. The electrolyte temperature was 25° C. and the current density varied from 1.00 to 0.75 amps per square decimetre as the anodic film built up. The sheets were washed and dried and provided with a light sensitive coating as in Example 1. The coated sheets were then image-wise exposed and developed in the manner of Example 2. The resultant printing plates were very wear resistant and capable of producing many thousands of good quality copies.

EXAMPLE 5

A sheet of electrochemically etched aluminium of 99.7% purity was immersed in a 20% v./v. aqueous solution of orthophosphoric acid of S.G. 1.75 and connected as the anode in an electrical circuit. A steel plate was used as the cathode. A direct current at a constant voltage of 30 volts was passed though the circuit for 6 minutes whilst the solution was maintained at a temperature of 20° C. The anodised sheet was then washed and dried and thereafter provided with a light sensitive coating as in Example 3. The coated sheet was then image-wise exposed and developed in the manner of Example 2. The resultant printing plates were very wear resistant and capable of producing many thousands of good quality copies.

EXAMPLE 6

A sheet of lithographic quality aluminium of 99.7% purity and a sheet of 2S grade aluminum were anodised using phosphoric acid as electrolyte by the technique described in Example 1. Each sheet was then coated with a solution comprising 2 parts by weight of 4'-methoxy-diphenylamine-4-diazonium chloride and 10 parts by weight of the novolake resin known under the designation PF 402 (Imperial Chemical Industries) and which is the condensation product of phenol and formaldehyde. After drying, each coated sheet was heated to a temperature less than the decomposition temperature of the diazo salt. Each plate thus obtained was storage stable for many months. After image-wise exposure and development with weak alkaline solution, each plate gave rise to a lithographic printing plate capable of producing many thousands of good quality copies.

Each of Examples 1, 2 and 4 was repeated with the p-dimethylaminobenzene diazonium chloride replaced in turn by similar quantities of p-diethylaminobenzene diazonium chloride, p-diethoxyamino benzene diazonium chloride, p-phenylethyl aminobenzene diazonium chloride, p-phenylmethyl aminobenzene diazonium chloride, p-ethyl-hydroxyethyl aminobenzene diazonium zinc dichloride, and 2,5 - diethoxy 4-morpholino benzene diazonium fluoborate. Each of Examples 3 and 5 was repeated with the p-dimethylaminobenzene diazonium zinc dichloride replaced in turn by similar quanities of p-diethylaminobenzene diazonium zinc dichloride, p-diethoxyaminobenzene zinc dichloride, p-phenylethylaminobenzene diazonium zinc dichloride, p-phenylmethyl aminobenzene diazonium zinc dichloride, p-ethyl hydroxyethyl aminobenzene diazonium zinc dichloride and 2,5-diethoxy 4-morpholino benzene diazonium fluoborate. In each case, there was obtained a presensitised printing plate which could be stored for many months before use and which on image-wise exposure and development gave rise to a printing plate having a long printing life.

I claim:

1. Process for preparing a presensitized printing plate which comprises electrolytically anodizing a surface of an aluminum or aluminum alloy support sheet using an aqueous solution of phosphoric acid as the electrolyte, and coating the said anodized surface with a light sensitive layer in direct contact therewith comprising a mixture of a novolak resin and a diazo salt, a diazo double salt, or a complex of a diazo salt.

2. Process according to claim 1 wherein the diazo salt is a compound of the formula:

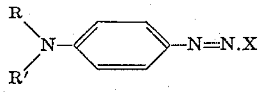

wherein R and R′ are the same or different, wherein each of R and R′ is selected from the group consisting of a hydrogen atom, aliphatic radicals and aromatic radicals or R and R′ together form a heterocyclic radical with the nitrogen atom of the amine group, and wherein X is and acid radical.

3. Process according to claim 2, wherein one or each of R and R′ in the formula is selected from the group consisting of alkyl radicals, hydroxyalkyl radicals, aryl radicals, and alkoxy radicals.

4. Process according to claim 3 wherein one or each of R and R′ in the formula is selected from the group consisting of methyl, ethyl, phenyl, benzyl and ethoxy radicals.

5. Process according to claim 2, wherein in the formula R and R′ together form a morpholino radical with the nitrogen atom of the amino group.

6. Process according to claim 2, wherein the diazo salt is selected from the group consisting of p-dimethylaminobenzene diazonium chloride, p-diethylaminobenzene diazonium chloride, p-hydroxyethyl amino benzene diazonium chloride, p-phenylethyl amino benzene diazonium chloride, p-phenylmethyl amino benzene diazonium chloride, p-ethyl hydroxyethyl amino benzene diazonium chloride, 4′-methoxy-diphenylamine - 4 - diazonium chloride, and 2,5-diethoxy-4-morpholino benzene diazonium chloride.

7. Process according to claim 1, wherein the electrolyte is a 5 to 50% v./v. aqueous solution of phosphoric acid of specific gravity 1.75.

8. Process according to claim 1, wherein the anodising is effected using a current density of from 0.5 to 2.0 amperes per square decimetre.

9. Process according to claim 1, wherein the anodising is effected whilst the electrolyte is at a temperature of from 15 to 30° C.

10. Process according to claim 1, wherein the anodising is effected for from 2 to 20 minutes.

11. Process according to claim 1, wherein the novolak is the acid condensation product of cresylic acid, formaldehyde and maleic acid.

12. Process according to claim 1 in which (i) a surface of said aluminum or aluminum support sheet is electrolytically anodized for from 2 to 20 minutes using a 5 to 50% v./v. aqueous solution of phosphoric acid of specific gravity 1.75 as electrolyte at a temperature of from 15 to 30° C. and a current density of from 0.5 to 2.0 amperes per square decimeter, and in which (ii) said anodized surface is coated with a light sensitive mixture of a novolak resin and (a) a diazo salt of the formula:

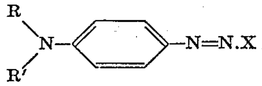

wherein R and R′ are the same or different, wherein each of R and R′ is selected from the group consisting of a hydrogen atom, aliphatic radicals and aromatic radicals or R and R′ together form a heterocyclic radical with the nitrogen atom of the amine group, and wherein X is an acid radical, (b) a double salt of a diazo salt of the above formula, or (c) a complex of a diazo salt of the above formula.

13. A presensitised printing plate comprising an aluminum or aluminium alloy support sheet having a surface anodised in aqueous phosphoric acid electrolyte and coated with a light sensitive mixture of a novolak resin and a diazo salt, a diazo double salt or a complex of a diazo salt.

References Cited

UNITED STATES PATENTS

| | | | |
|---|---|---|---|
| 3,219,447 | 11/1965 | Neugebauer et al. ______ | 96—33 |
| 3,511,661 | 5/1970 | Rauner et al. _________ | 96—86 |

DAVID KLEIN, Primary Examiner

U.S. Cl. X.R.

117—34; 96—33; 101—459, 456